US005176582A

United States Patent [19]

Chang et al.

[11] Patent Number: 5,176,582

[45] Date of Patent: Jan. 5, 1993

[54] CHAIN GUIDE FOR OVERHEAD DOOR OPENER

[75] Inventors: James S. Chang, Arlington Heights; Mark D. Siegler, Brookfield, both of Ill.

[73] Assignee: The Chamberlain Group, Inc., Elmhurst, Ill.

[21] Appl. No.: 908,778

[22] Filed: Jul. 1, 1992

Related U.S. Application Data

[63] Continuation of Ser. No. 714,446, Jun. 13, 1991, abandoned.

[51] Int. Cl.[5] .......... F16H 7/18

[52] U.S. Cl. .......... 74/140; 49/360

[58] Field of Search .......... 474/101, 111, 140; 49/199, 200, 360, 362

[56] References Cited

U.S. PATENT DOCUMENTS

| | | | |
|---|---|---|---|
| 1,043,492 | 11/1912 | Werner | 49/360 |
| 2,822,166 | 2/1958 | Herbert | 49/199 |
| 3,172,651 | 3/1965 | Wilson | 49/360 |
| 3,448,628 | 6/1969 | Shimano | 474/111 |
| 3,481,074 | 12/1969 | Moss | 49/360 |
| 3,838,606 | 10/1974 | Scalise | 474/111 |
| 4,082,007 | 4/1978 | Strickland | 74/240 |
| 4,311,225 | 1/1982 | Tsubaki et al. | 192/142 R |
| 4,827,668 | 5/1989 | Bechtold | 49/325 |
| 4,832,664 | 5/1989 | Gröger et al. | 474/111 |
| 4,879,977 | 11/1989 | Restelli | 123/90.31 |
| 4,984,387 | 1/1991 | Wheatland | 49/362 |
| 5,000,724 | 3/1991 | Reid | 474/111 |

FOREIGN PATENT DOCUMENTS

| | | | |
|---|---|---|---|
| 825063 | 12/1951 | Fed. Rep. of Germany | 474/111 |

*Primary Examiner*—Renee S. Luebke
*Assistant Examiner*—F. Saether
*Attorney, Agent, or Firm*—Fitch, Even, Tabin & Flannery

[57] ABSTRACT

A chain guide is provided for the otherwise unsupported upper run of the endless roller chain of a motor-driven garage door operator. With the chain loop in a vertical plane, the chain guide takes the form of a trough having at its bottom an upstanding central ridge which supports the chain by its rollers and with the links clear of contact with the floor and sides of the trough. The chain guide is supported indirectly by the trackage of the door operator, being mounted upon the fixed rail spacer of one form and carried upon the movable trolley of the other.

5 Claims, 2 Drawing Sheets

Fig. 1
PRIOR ART
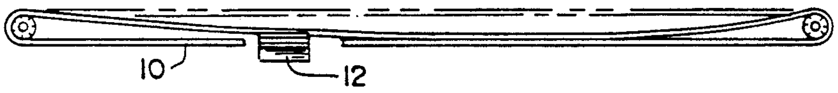
Fig. 2
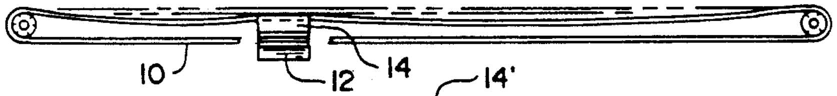
Fig. 3
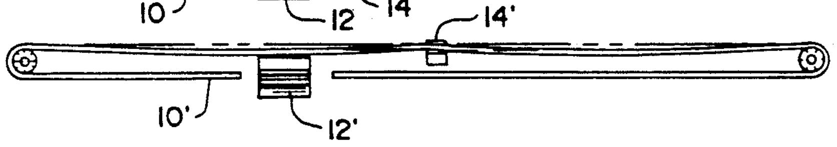
Fig. 4
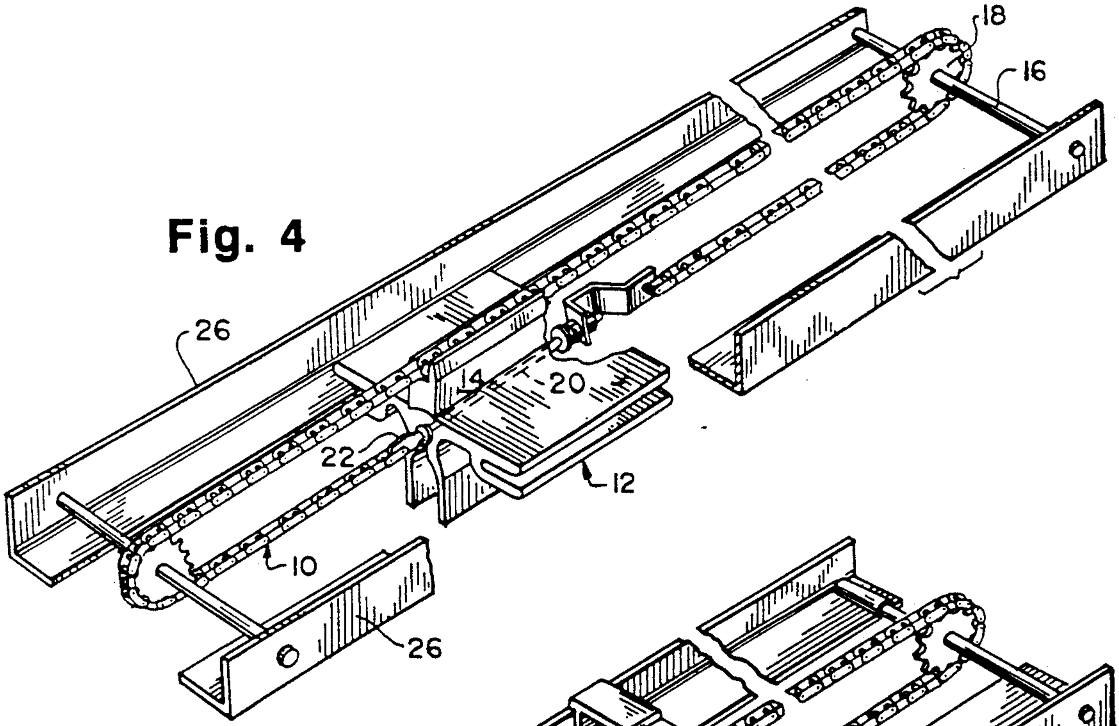
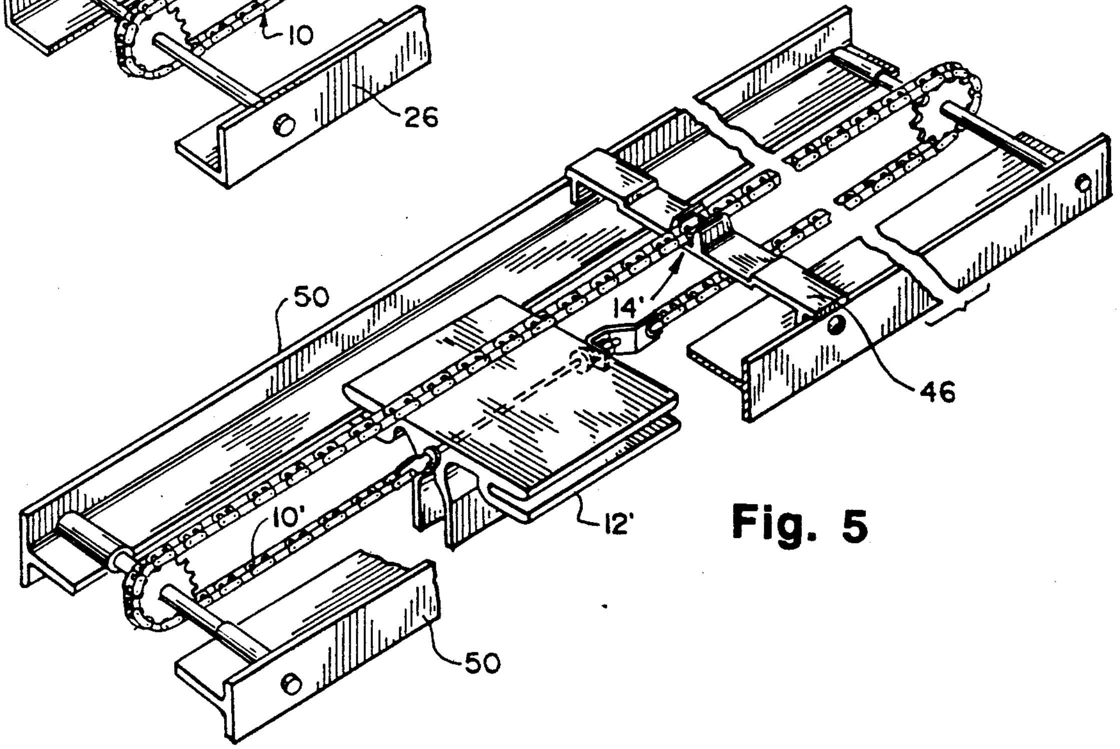
Fig. 5

CHAIN GUIDE FOR OVERHEAD DOOR OPENER

This application is a continuation-in-part of application Ser. No. 07/714,446, filed Jun. 13, 1991, now abandoned.

This invention relates to roller-chain driven, power-operated overhead door operators, and in particular to a roller-chain guide for supporting long runs of chain in such a door operator.

BACKGROUND OF THE INVENTION

While overhead door openers have taken a variety of forms, one of the more common types for moderate to heavy service in opening and closing horizontally-sectioned folding vehicle doors employs parallel-rail overhead trackage for a trolley connected by a suitable link or linkage to the upper section of the door, and drawn to and fro on the rails by an essentially endless roller chain trained over a drive sprocket at one end of the track and a return sprocket at the other.

As each run of the chain in such arrangements is somewhat longer than the height of the door, it is apparent that as sprocket size is reduced for overall height reduction in those chain drives whose chain loops lie in a vertical plane, the catenary sag of the upper run of the chain can bring it into contact with the trolley as those members move in opposite directions during operation, particularly in drive chains of door-operators for tall doors. Not only is such contact noisy, but the sliding contact of the chain links with the upper surface of the trolley causes unnecessary wear on both the chain and the trolley, needlessly increasing the expense of maintenance.

It is accordingly an object of this invention to provide a chain guide and support for vertically-oriented chain loops of door-operators which will lift the upper run of the chain out of contact with the oppositely moving trolley, and support the chain by its individual rollers and thus out of chain-link contact with the trolley or other relatively moving parts.

SUMMARY OF THE INVENTION

This invention contemplates the intermediate support of the otherwise unsupported expanse of chain between the drive sprocket and the return sprocket at opposite ends of the chain run. It further contemplates a lifting guide in the form of a trough having a central longitudinal ridge upstanding from the floor of the trough sufficiently to elevate the chain links above the floor of the trough while the flat top of the ridge supports the chain in rolling contact with its rollers, and with running clearance between the ridge track and the flanking links of the chain. In this arrangement, supporting sliding engagement of the roller chain by its links, and the attendant wear of chain and contacting part alike, are essentially avoided.

DESCRIPTION OF THE DRAWINGS

The invention is explained in the following specification in reference to the accompanying drawings, of which:

FIG. 1 is a diagrammatic side elevation of the chain loop of a door opener illustrating in somewhat exaggerated form the catenary sag of the upper run of the chain when unsupported;

FIG. 2 is a view similar to FIG. 1, showing the upper run of the chain supported by the chain guide of the invention carried atop the trolley of the operator;

FIG. 3 is a view similar to FIGS. 1 and 2 but showing the chain guide of the invention in a fixed mounting atop a spacer bar which holds the trolley tracks in parallel spaced relation;

FIG. 4 is a perspective view, partially broken away to foreshorten the trackage and chain run, illustrating the form of chain guide atop the trolley;

FIG. 5 is a view similar to FIG. 4, showing the alternate form with chain guide atop a rail spacer;

DESCRIPTION OF PREFERRED EMBODIMENTS

FIG. 1 illustrates the problem in vertical-loop roller chains employed in door openers, namely, that the unsupported upper run of the chain 10 may sag sufficiently to contact either the lower run of the chain itself or the trolley 12 which is moved along the rails by the lower run.

Figure 6:
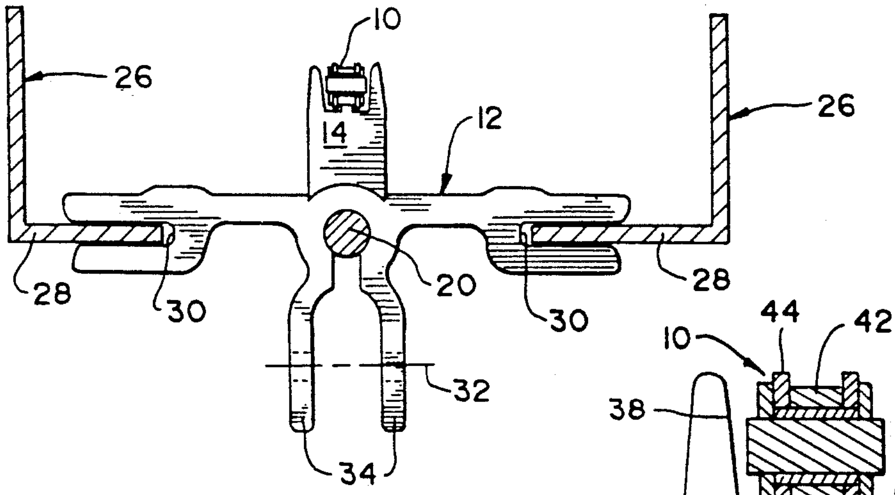
FIG. 6 is a cross-sectional view of the form of trackage and chain guide shown in FIG. 4.
Figure 7:
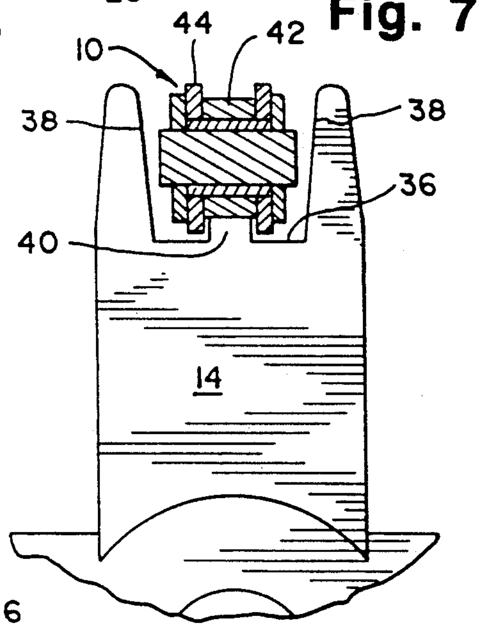
FIG. 7 is a fragmentary enlargement of the chain-guide portion of FIG. 6.

FIG. 2 illustrates diagrammatically the form of the chain guide of the invention shown in FIGS. 4, 6, and 7, i.e., wherein the chain guide 14 is mounted atop the door-opener trolley 12, and the upper run of the chain is engaged and lifted by the chain guide of the trolley as the latter is moved to and fro along the trolley track to raise or lower the door. It will be understood, of course, that the chain 12 is motor driven by chain- or other suitable-drive to the shaft 16 of one of the sprockets 18 illustrated in FIG. 4, and that the trolley 12 has pivotally connected to its underside a draft link suitably connected to a bracket on the upper door section to raise the door and to pull the folding sections thereof away from the door opening as the trolley is drawn in one direction along its track, and to lower the door by reversal of the drive motor and direction of movement of the trolley to push the connecting link in the closing direction to lower the door. These auxiliary parts and their relationships, being conventional and well understood, are not illustrated in the drawings.

Referring still to FIGS. 4 and 6, the endless chain 10 is connected to the trolley 12 by means of a threaded rod 20 which passes through a longitudinal groove in the trolley, shaped to accept and to confine the rod. One end 22 of the rod 20 is flattened to fit between the chain links at one end of the chain and drilled to be secured thereto by a suitable pin with fastener to prevent its dislocation. The rod 20 emerges from the opposite end of the trolley, passing through a metal bracket 24 which is secured to the trolley by a nut and locknut on the rod 20, and secured to the opposite end of the roller chain 10 in the same manner as the chain is connected to the flattened end 22 of the rod 20.

The trolley 12 itself, referring to FIGS. 4 and 6, is an extruded aluminum member which fits between a pair of opposed rails 26, illustrated as angle rails, which are held in spaced and facing relation to present horizontal flanges 28 to running grooves 30 formed in opposite sides of the trolley. The dimension of the trolley 12 in the direction of the chain run is adequate to stabilize the trolley on the rails 26 against the turning moment occasioned by the vertical offset between the rail-receiving running grooves 30 and the underslung pivotal connection 32 of the operating link of the door to the depending saddle flanges 34 of the trolley.

The chain guide 14 itself, which may be extruded integrally with the trolley or separately secured thereto in any suitable fashion, is essentially co-extensive with the trolley 12 in the direction of the chain 10, and formed on its top to have a longitudinally extending groove 36, the sidewalls 38 of which are preferably sloped to narrow the groove at the bottom, and the bottom wall of which is provided with a central longitudinal ridge 40 best seen in FIG. 7. The depth of the groove 36 is such as to accept the full height of the chain 10, which is supported by its individual rollers 42 on the flat top of the central longitudinal ridge 40 at the bottom of the groove.

As shown in FIG. 7, the height of the central ridge 40 elevates the chain links 44 clear of the bottom of the groove and out of sliding contact with the floor and sidewalls of the groove.

In terms of dimensions, the height of the central ridge 40 above the floor of the trough is greater than half the difference between the height of the chain links and the diameter of the chain rollers. Its width is also sufficiently less than the length of the chain rollers to provide running clearance between the links and the side surfaces of the ridge, and to accommodate minor misalignment of the guides.

That is to say, the chain 10 is supported on the central ridge 40 of the groove entirely by its rollers 42 and simply rolls through the groove with no frictional sliding contact with the chain guide except for the confining contact between the inner surfaces of the chain links 44 and the side surfaces of the central supporting ridge 40 which serves as a track for the rollers of the chain. Contact pressure between these surfaces, however, is free from the effect of gravity and does not occasion extensive wear. As the individual rollers 42 of the chain 10 meet the oncoming end of the chain guide 14 in the form of FIGS. 4, 6, and 7, each individual chain roller 42 moves onto the central ridge 40, the opposite ends of which may be beveled slightly to smooth the contact of the oncoming chain rollers therewith.

Figure 8:
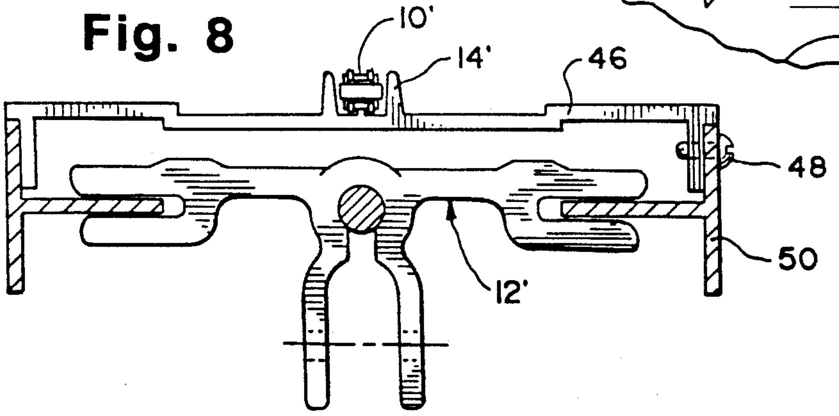
FIG. 8 is a cross section of the alternate form of chain-guide mounting of FIG. 5.
Figure 9:
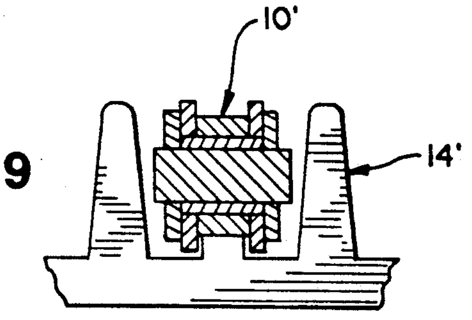
FIG. 9 is a fragmentary enlargement of the chain-guide portion of FIG. 8.

In the alternative form of chain-guide mounting of FIGS. 3, 5, 8, and 9, i.e., with one or more chain guides 14' mounted on rail spacers 46 in lieu of a single chain guide atop the trolley 12, the chain guide 14' is preferably extruded integrally with the rail spacer 46, one or more which are secured by screws 48 to the vertical flanges of the opposed rails 50 and formed for a lapping fit with the rails, illustrated as T-shaped in FIG. 8. The form of the grooved chain guide 14' is identical in cross section to that of the form of chain guide 14 carried atop the trolley earlier described in connection with FIGS. 4, 6, and 7, and bears the identical relationship to, and provides the same support of, the chain 10' by its individual rollers as the chain passes through the chain guide.

In both forms of the invention, the support of the chain guides 14 and 14' is derived from the trolley rails 26 and 50 themselves respectively, in the one case being formed as part of, or as mounted upon, the trolley 12 itself, and in the other case as an integral part of one or more rail spacers 46, thus lifting the upper run of the chain out of contact with the upper surface of the trolley passing underneath.

The support of the chain 10 by its rollers 42 rather than by the connecting links 44 of the chain, protects both the chain and the chain guide from the wear occasioned by sliding contact with the links of the chain, and reduces both the wear and the noise heretofore experienced from the gravitational sag of the otherwise unsupported upper run of the endless drive chain.

The features of the invention believed new and patentable are set forth in the appended claims.

What is claimed is:

1. In a power-operated door opener wherein the door is actuated by a trolley mounted on a pair of parallel rails secured to each other in spaced relation, and the trolley is moved along said rails by a motor-driven roller chain trained about a drive sprocket and a return sprocket rotatably mounted between said rails at opposite ends thereof with the runs of the chain disposed one above the other in the space between said rails, a chain guide supported by said rails to receive and support the upper run of the roller chain, said guide comprising an upwardly-open trough of inside width greater than the thickness of the chain measured in the direction of the link pins, said trough having at its bottom an upstanding central longitudinal ridge, said ridge having a height greater than half the difference between the height of the chain links and the diameter of the chain rollers, said ridge also having a flat top to engage and support the rollers of the chain and a width enough less than the length of the chain rollers that the width and height of the ridge provide running clearance for the chain links in said trough.

2. The chain guide of claim 1 fabricated as an extrusion.

3. The chain guide of claim 1 mounted atop and movable with the trolley.

4. The chain guide of claim 1 mounted upon a rail spacer overlying and connecting said rails.

5. The chain guide of claim 4 wherein the chain guide and rail spacer are an integral extrusion.

* * * * *